(12) United States Patent
Saylor et al.

(10) Patent No.: US 9,264,480 B1
(45) Date of Patent: Feb. 16, 2016

(54) FILE ACCESS

(71) Applicant: MicroStrategy Incorporated, Vienna, VA (US)

(72) Inventors: Michael J. Saylor, Vienna, VA (US); Hector Vazquez, Vienna, VA (US); Gang Chen, Vienna, VA (US); Sergey Mironenko, Ellicott City, MD (US); Yue Sun, Falls Church, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 13/675,623

(22) Filed: Nov. 13, 2012

(51) Int. Cl.
*H04L 29/08* (2006.01)

(52) U.S. Cl.
CPC ..................... *H04L 67/06* (2013.01)

(58) Field of Classification Search
CPC .................................................. G06F 21/60
USPC ......... 707/705, 783, 784, 785, 827, 825, 822, 707/999.009, 999.008, 999.01; 726/28
See application file for complete search history.

(56) References Cited

U.S. PATENT DOCUMENTS

| | | | | |
|---|---|---|---|---|
| 5,892,904 | A * | 4/1999 | Atkinson et al. | 726/22 |
| 6,122,631 | A * | 9/2000 | Berbec et al. | |
| 7,424,543 | B2 * | 9/2008 | Rice, III | 709/229 |
| 2003/0112977 | A1 * | 6/2003 | Ray et al. | 380/270 |
| 2006/0193474 | A1 * | 8/2006 | Fransdonk | 380/279 |
| 2010/0235649 | A1 * | 9/2010 | Jeffries et al. | 713/189 |
| 2011/0010556 | A1 * | 1/2011 | Little et al. | 713/176 |
| 2011/0131115 | A1 * | 6/2011 | Yamanaka et al. | 705/27.2 |
| 2012/0136732 | A1 * | 5/2012 | McMillen et al. | 705/16 |

OTHER PUBLICATIONS

Miltchev et al. (Secure and Flexible Global File Sharing, USENIX Annual Technical Conference (FREENIX Track), Jun. 9-14, 2003).*
Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.
Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

(Continued)

*Primary Examiner* — Jay Morrison
*Assistant Examiner* — Ken Hoang
(74) *Attorney, Agent, or Firm* — Fish & Richardson P.C.

(57) ABSTRACT

A server receives a request from a first client device for a file access code. The server generates the file access code, including associating a validity time period with the file access code. The server associates the file access code with a user account at the server and transmits a response to the first client device including the file access code. The server receives, from the first client device, information corresponding to an electronic file. Based on determining that the validity time period for the file access code has not elapsed, the server generates an association between the electronic file and the file access code. The server receives, from a second client device, the file access code. Based on determining that the validity time period of the file access code has not elapsed, the server identifies the electronic file and enables the second client device to access the electronic file.

21 Claims, 9 Drawing Sheets

(56) References Cited

OTHER PUBLICATIONS

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

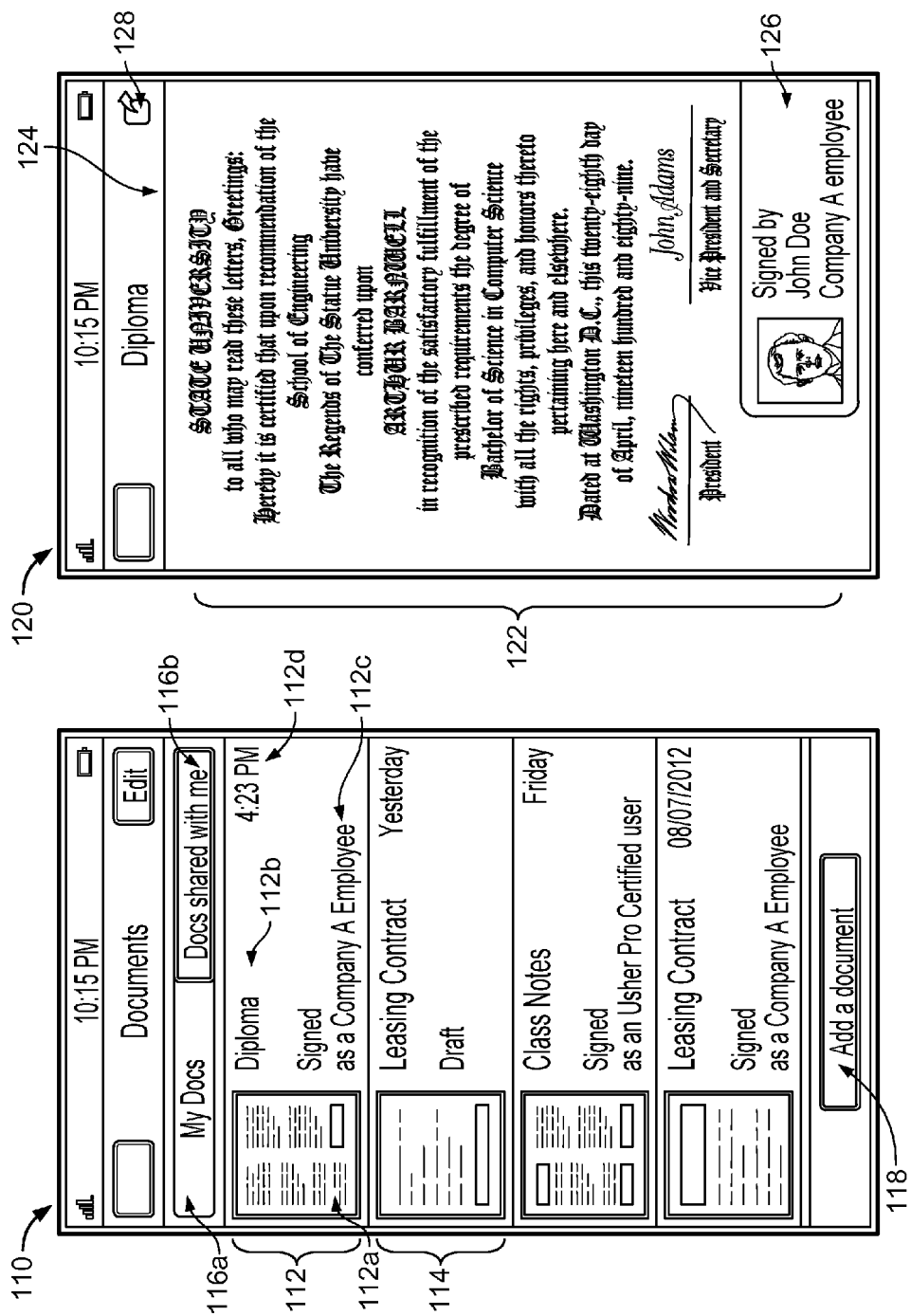

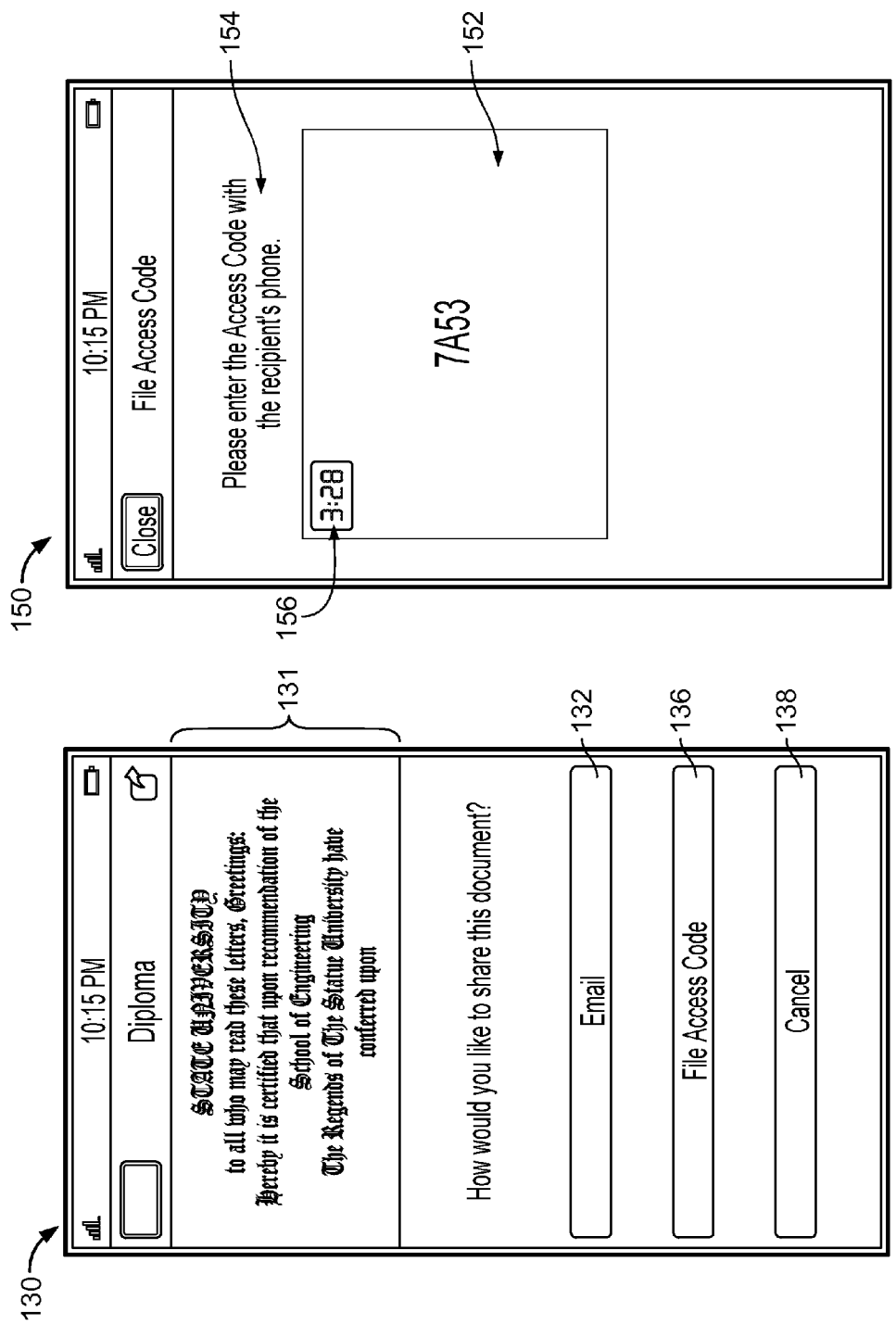

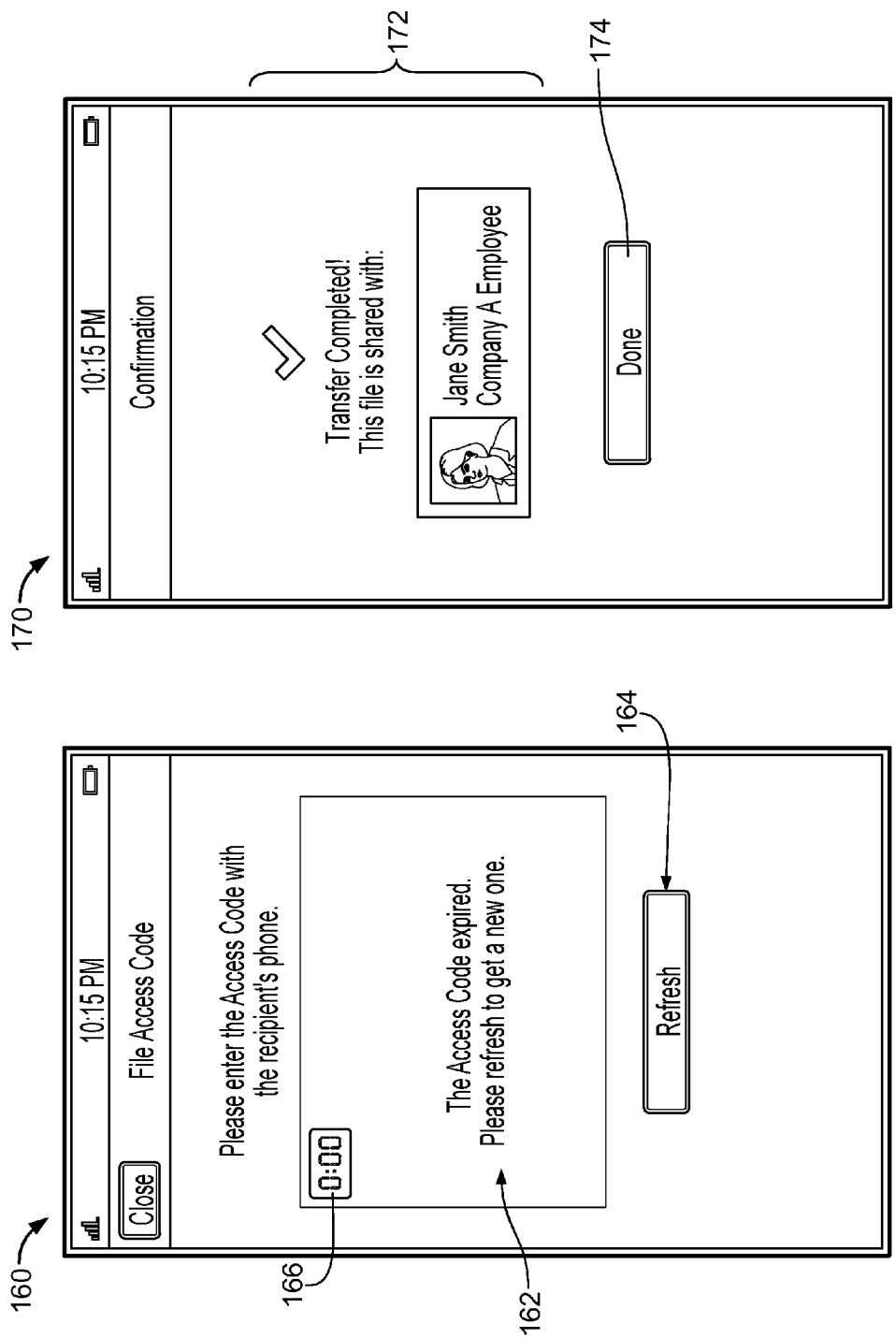

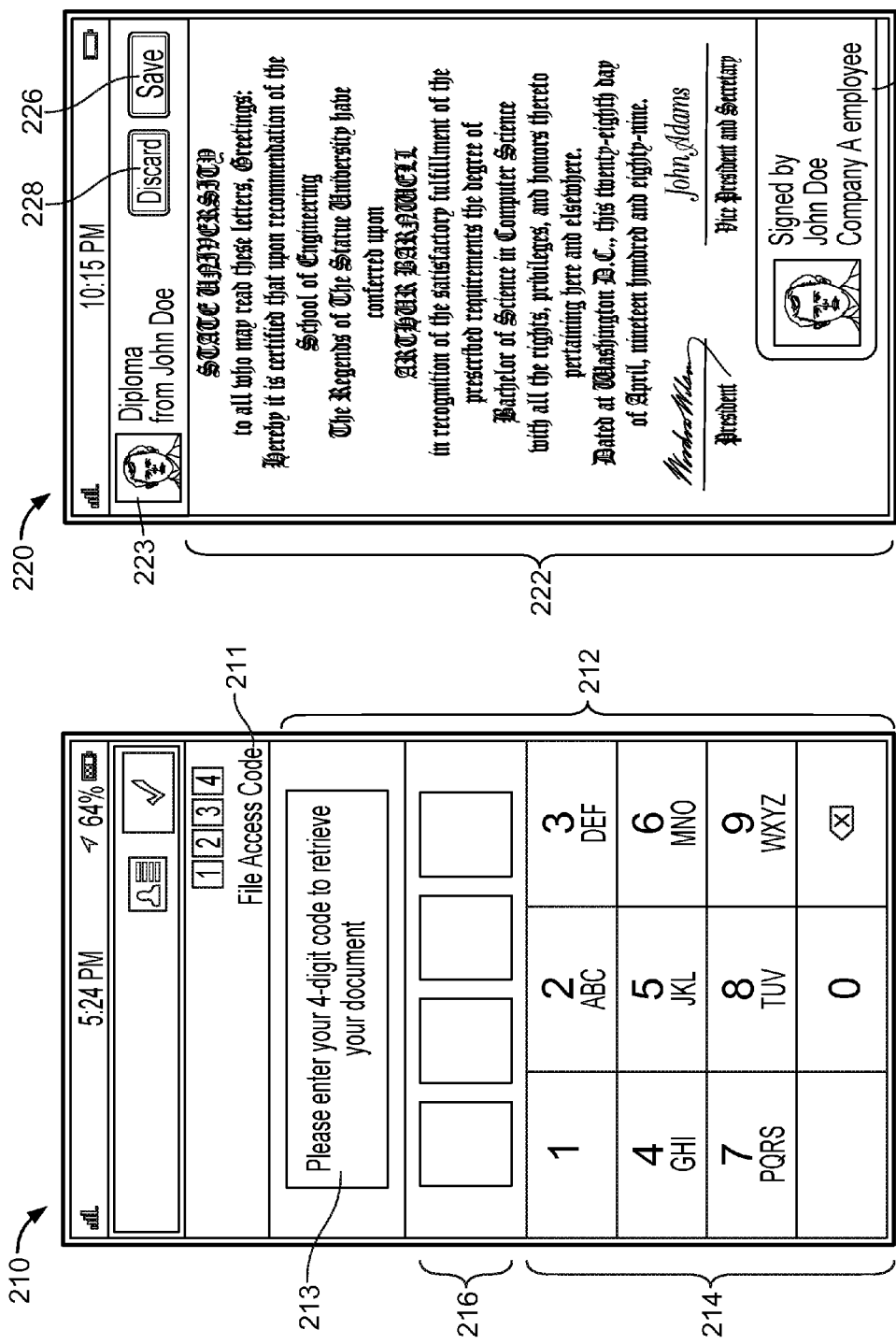

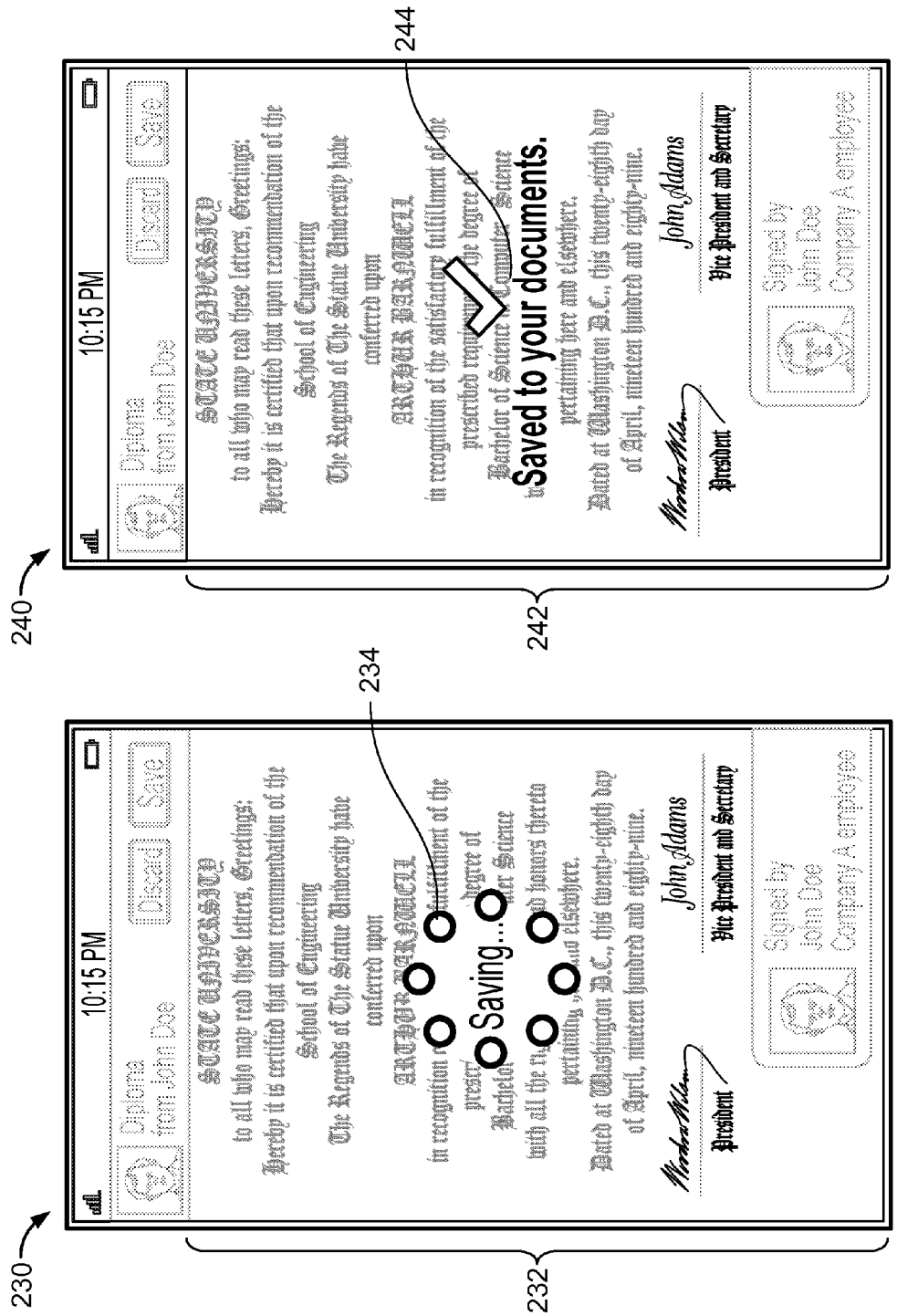

FILE ACCESS

TECHNICAL FIELD

This disclosure generally relates to electronic file access.

BACKGROUND

A server may be used to store files that are associated with user accounts. Users may access the files using applications running on their respective client devices.

SUMMARY

An electronic file may be shared between client devices in a client-server system by using a file access code that is generated by the server. The server may store a copy of the electronic file along with a file access code associated with the file, and enable a client device that provides the file access code to access the electronic file.

In one aspect, a server receives a request from a first client device for a file access code. The request includes a user identifier associated with the first client device and a credential identifier. Responsive to receiving the request, the server determines, based on the credential identifier, that the user identifier is associated with a user account at the server. The server generates the file access code, including associating a validity time period with the file access code. The server associates the file access code with the user account. The server transmits a response to the first client device including the file access code.

The server receives, from the first client device, information corresponding to an electronic file, including an indication for associating the electronic file with the file access code. Responsive to receiving the information corresponding to the electronic file, the server determines whether the validity time period for the file access code has elapsed. Based on determining that the validity time period has not elapsed, the server generates an association between the electronic file and the file access code.

The server receives, from a second client device, the file access code. Responsive to receiving the file access code from the second client device, the server determines whether the validity time period for the file access code has elapsed. Based on determining that the validity time period has not elapsed, the server identifies the electronic file based on the association between the electronic file and file access code. The server enables the second client device to access the information corresponding to the electronic file.

Implementations may include one or more of the following. Generating the file access code may include generating one of an alphanumeric string, a phrase or a hexadecimal code. The electronic file may be one of a textual document, a graphical document, an audio file, a video file or a multimedia file.

The server may receive, from the first client device, the identifier of the electronic file. The server may store the electronic file, including the association with the file access code. The server may store the electronic file in association with the user account. The server may store the electronic file prior to generating the file access code. The server may store the electronic file in an encrypted form. The electronic file may be authenticated using a digital signature associated with the user identifier.

Based on determining that the validity time period has not elapsed, the server may transmit a query to the first client device for confirmation that a user associated with the second user identifier is authorized to access the electronic file. The server may receive, from the first client device, a response to the query. The server may determine, based on the response to the query, whether the user associated with the second user identifier is authorized to access the electronic file. Based on determining that the user associated with the second user identifier is authorized to access the electronic file, the server may enable the user associated with the second user identifier to access the information corresponding to the electronic file.

Based on determining that the validity time period has not elapsed, the server may check whether the second user identifier is included in a whitelist of user identities. Based on determining that the second user identifier is included in the whitelist of user identities, the server may transmit the electronic file to the second client device. The whitelist of user identities may include a group of user identities that are indicated as authorized to access the electronic file by a user associated with the first client device. The server may receive the whitelist of user identities from the first client device.

Receiving the file access code from the second client device may include the server receiving the file access code from an application running on the second client device. The server may be configured to determine whether the file access code is authenticated by the application running on the second client device prior to transmitting the electronic file to the second client device.

Transmitting the electronic file to the second client device may include the server transmitting the electronic file to the application running on the second client device. The application may be configured for displaying the electronic file on the second client device using a user interface associated with the application. The application may prevent the second client device from locally storing a copy of the electronic file.

Enabling the second client device to access the information corresponding to the electronic file may include transmitting, by the server and to the second client device, an identifier associated with the electronic file. Enabling the second client device to access the information corresponding to the electronic file may include transmitting, by the server and to the second client device, a copy of the electronic file.

The server may receive, from a third client device, the file access code. Responsive to receiving the file access code from the third client device, the server may determine whether the validity time period for the file access code has elapsed. Based on determining that the validity time period has elapsed, the server may transmit a message to the third client device, the message indicating a refusal to send the electronic file to the third client device.

In another aspect, a server receives a request from a first client device for a file access code. Responsive to receiving the request, the server generates the file access code. The server transmits a response to the first client device including the file access code. The server receives, from the first client device, information corresponding to an electronic file, including an indication for associating the electronic file with the file access code. Responsive to receiving the information corresponding to the electronic file, the server generates an association between the electronic file and the file access code. The server receives, from a second client device, the file access code. Responsive to receiving the file access code, the server identifies the electronic file based on the association between the electronic file and file access code. The server transmits the electronic file to the second client device.

Implementations of the above techniques include a method, a computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more aspects of the subject matter described in this specification are set forth in the accompanying drawings and the description, below. Other potential features will be apparent from the description and drawings, and from the claims.

BRIEF DESCRIPTION OF THE DRAWINGS

FIGS. 1A-1F illustrate examples of pages for sharing an electronic file that are presented on the display of a client device.

FIGS. 2A-2E illustrate examples of pages shown on a display of a client device for accessing from a server an electronic file that is shared with the user of the client device.

DETAILED DESCRIPTION

Figure 2E:
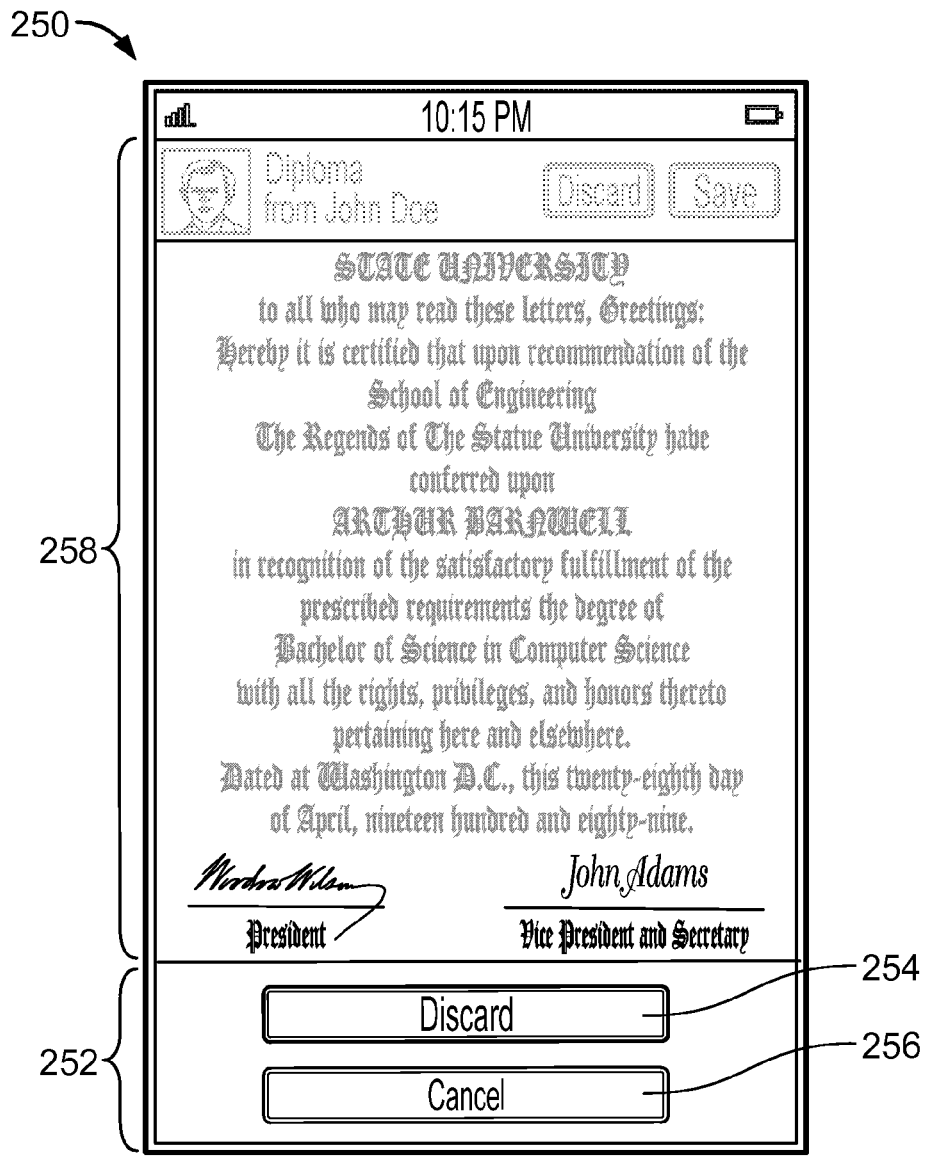

A centralized device such as a network computer server may facilitate the sharing of electronic files among client devices that can communicate with the server. In this context, an electronic file may be any software file that includes data and can be stored in electronic form in tangible storage media, such as computer memory or hard drives. For example, the electronic file may be a textual document, a graphical document, an audio file, a video file or a multimedia file.

Representations for these electronic files may be managed by a server or collection of servers. The electronic files may be stored on the client devices or on a server with which the client devices can communicate. The server may include user accounts for the users of the client devices, and associate the electronic files with user accounts corresponding to the owners of the electronic files. Users may communicate with the server using instances of a client software application that runs on their respective client devices.

In order to share an electronic file, a user may obtain a file access code for the file from the server via the client software application running on his/her client device, and share the file access code with a recipient. The electronic file may be stored at the server or uploaded by the user. Subsequently, the recipient can validate the recipient's authorization to access the electronic file to the server by entering the file access code into the client software application running on the recipient's client device. Once the recipient's authorization to access the electronic file is validated, the server may allow the recipient to access the electronic file.

Systems that generate, distribute, and validate file access codes for access to electronic files are described in the following sections. For the purposes of this discussion, in the following sections, the terms user and client device associated with the user are used interchangeably. The terms server and server application are used synonymously, as are the terms client software application, software application and client device.

FIGS. 1A-1F illustrate examples of pages 110, 120, 130, 150, 160 and 170 for sharing an electronic file that are presented on the display of a client device. The pages 110, 120, 130, 150, 160 and 170 are presented by the graphical user interface (GUI) of the software application executed on a user's client device to allow the user of the client device, who is the sender of an electronic file, to communicate with a server for generating a file access code for the electronic file. The sender may be the owner of the electronic file, or have the authorization to share the electronic file with other users, or both. The software application may be implemented as a set of instructions that are stored in some tangible storage medium associated with the client device, such as a magnetic hard drive, read-only memory (ROM) or random access memory (RAM) that is included in, or coupled to, the client device. The set of instructions may be executed by a processor associated with the client device for generating the pages 110, 120, 130, 150, 160 and 170 and enabling communication with the server.

In some implementations, the sender client device may be a mobile device, such as a smartphone, an electronic tablet computer, a laptop computer or a portable music player. In such implementations, the software application may be a mobile application, and the pages 110, 120, 130, 150, 160 and 170 may be suitably formatted for presentation on the display of the mobile device. In other implementations, the sender client device may be a desktop computer. In such implementations, the software application may be a conventional software application, and the pages 110, 120, 130, 150, 160 and 170 may be suitably formatted for presentation on the display of the desktop computer.

FIG. 1A illustrates a page 110 of the software application that shows a list of electronic files, such as 112 and 114, which are available to the user of the client device within the application. The page 110 is presented on a display of a client device. In the example shown, the electronic files are documents, such as, for example, MICROSOFT WORD or ADOBE PDF files. The documents may be stored locally on the client device. For example, the documents may be saved in the tangible storage medium associated with the client device. Alternatively, the documents may be stored on the server and accessible to the client device from the server over a network connection.

Some of the electronic files may be owned by the user of the client device, while some other electronic files may be owned by other entities, but shared with the user of the client device. Based on the selection of the buttons 116a or 116b, the page 110 can switch between views that show the list of documents owned by the user of the client device and the list of documents shared with the user, respectively. However, in some implementations, the page 110 can show in a single view both lists of documents owned by the user of the client device and documents shared with the user of the client device. In the example shown, the button 116 is selected, such that the page 110 shows the list of documents owned by the user of the client device.

For either list discussed above, each item in the list may include a small graphical representation (for example, a "thumbnail") of the electronic file and an identifier for the electronic file, such as a filename. In addition, each item may include information indicative of whether the electronic file has been electronically signed (for example, information indicative of whether the electronic file has been authenticated using a digital signature). For example, the owner of the file may have signed the electronic file using a private key belonging to the owner. In some implementations, the file owner may have several different identities and a different private key for each identity. In such cases, the file owner may authenticate different files using different digital signatures. The digital signatures may be based on public key infrastructure (PKI), for example, the Digital Signature Algorithm (DSA).

Each item also may include a timestamp. The timestamp can indicate the time when the electronic file was created, the time when the electronic file was included in the displayed list of electronic files (for example, the file may have been added to the list using the button 118), or the time the electronic file was last accessed or modified. For example, the file 112 includes a thumbnail 112a, a filename 112b, an indication 112c that it was signed with an identity "Company A Employee," and a timestamp 112d.

Although page 110 shows a list of electronic files, other arrangements of the electronic files are also possible. For example, in some implementations, the page 110 may present the electronic files in a grid view, with each file being represented by a thumbnail and, optionally, by the filename.

The user of the client device may wish to share one of the files, for example, 112, with another user. In this case, the user of the client device also may be considered a sender of the electronic file, and the two terms user and sender may be used interchangeably throughout. The other user receiving the electronic file may be referred to as a recipient.

In order to share the file, the sender selects the file from the displayed list. For example, the display may be a touchscreen display, and the sender may select file 112 by pressing on an area of the display that shows the item 112. Once the item 112 is selected, the software application transitions to page 120, which is shown in FIG. 1B. Page 120 shows an enlarged representation of the selected file. In some implementations, page 120 provides a graphical representation 122 of the selected file, as in the example shown. In other implementations, the page 120 may merely include additional information indicative of various attributes of the selected file, such as size, encoding format, timestamp, location, or any other suitable attribute.

The page 120 also displays the identifier 124 of the file and an indication 126 that the file has been digitally signed. For files that are not digitally signed, the indication 126 may be absent.

The page 120 enables the sender to review the selected file in some detail. If the sender now decides to proceed with sharing the file, the sender is provided with several options by which the file may be shared. In order to see the options for sharing, the sender selects button 128, upon which the software application transitions to displaying page 130 on the display of the client device.

As illustrated in FIG. 1C, page 130 presents buttons 132 and 136 representing the different options for sharing the selected electronic file. In some implementations, the options are presented as an overlay on the enlarged representation of the selected electronic file, which may be shadowed as shown by 131, indicating that the enlarged representation of the selected electronic file is in the background. Apart from the buttons 132 and 136, the page 130 also presents a "Cancel" button 138, in case the sender changes his/her mind and does not want to share the electronic file.

The sender may share the electronic file by electronic mail (email), by selecting the button 132. Consequently, a copy of the file, or an identifier associated with the file, may be emailed to the recipient.

In order to share the electronic file using a file access code, the sender selects the button 136. Based on the user input selecting button 136, the software application sends a request to the server to generate a file access code for the selected electronic file, which is indicated in the background 131 in page 130. As part of the request, the software application may send a locally stored credential to the server. The credential, which is described in greater detail below, may be tied to a user account linked to the user that is stored at the server. The credential may be used to identify the user to the server, and/or prove to the server, for example based on permissions associated with the linked user account, that the user is authorized to share the particular electronic file for which the file access code is requested.

Upon receiving the request, the server verifies the identity of the user, and/or the authorization of the user to share the electronic file. If the identity and/or the authorization are verified, the server generates a file access code corresponding to the selected electronic file and sends the generated code to the application on the client device of the sender.

In some implementations, the electronic file may be locally stored on the client device, but is not stored in storage medium coupled to the server. In such implementations, upon receiving the file access code from the server, the sender may upload the selected electronic file to the server using the application.

When the file is uploaded to the server, the server stores the file and associates the file with the file access code that is generated for the file such that the file access code serves as a reference to the electronic file.

In other implementations, the electronic files may reside on the server prior to the file access code being generated. Therefore, in such implementations, the sender does not have to upload the electronic file to the server when the file access code is generated.

In addition to displaying the control button 132, the page 130 may show a file access code button 136 that is generated for sharing the selected electronic file. The sender then can transfer the file access code 152 shown in FIG. 1D to an intended recipient of the electronic file. In some implementations, the sender can transfer the file access code 152 to the intended recipient using a separate mechanism like email, ultrasonic transmission, short message service (SMS), etc. or simply by speaking the file access code to the intended recipient (for example, in person or over the phone). In other implementations, the software application itself may provide an in-built option to transfer the file access code 146 to the client device of the intended recipient.

In the example shown, the file access code is an alphanumeric string, which may be just a string of alphabetical letters and digits or which may represent a hexadecimal number. In some implementations, the file access code may be a phrase composed entirely of alphabetical letters, or a number, or some other suitable representation. Although the page 150 shows the file access code as composed of 4 characters, in other implementations the file access code may include a different number of characters.

In some implementations, upon receiving the file access code from the server, the application transitions to page 150, that is shown in FIG. 1D. This may be the case, for example, when the electronic file is stored in storage medium coupled to the server; therefore, the file does not have to be uploaded to the server from the client device.

UI 150 displays to the user of the client device the file access code 152 that is generated for sharing the selected electronic file. Upon receiving the file access code from the server as displayed by the page 150, the sender can transfer the file access code 152 to the intended recipient, for example, using a separate mechanism like email, ultrasonic transmission, SMS, or by using an in-built option provided by the software application. In some implementations, the sender may simply read out the file access code to the recipient.

In some implementations, once a file access code is generated and linked to a file for sharing, the owner of the file may use the same code to share the electronic file with multiple users. In some such implementations, the server may set an expiry time for the file access code when generating the code. The expiry time provides a validity period during which the file access code may be used. If an attempt is made to use the file access code at a time that is beyond the expiry time of the code, the file access code may not be operable to retrieve the file and the server may send back a notification indicating that the code has expired.

In such implementations, a timer, such as 156, may be displayed on the page 150 adjacent to the file access code. The timer 156 indicates the time remaining (in appropriate units) before the file access code 152 expires. When the timer counts down to zero, that is, the file access code has expired, the application may display the page 160, which is shown in FIG. 1E.

Page 160 is similar to the page 150, except that in place of the file access code 152, page 160 displays a notification 162 informing the sender that the file access code has expired and the timer 166, which corresponds to the timer 156, indicates that there is no time remaining for using the associated file access code. In addition, the notification 162 prompts the sender to generate a new file access code. The sender may generate a new file access code for the file that the sender is attempting to share by selecting the button 164.

When the sender selects the button 164, the server generates a new file access code for the selected file. The server associates the file with the new file access code such that the new code serves as a refreshed reference to the electronic file. Subsequently the sender may share the new code with intended recipients of the file.

FIG. 1F illustrates a page 170 that displays a confirmation message to the sender when the file is successfully shared with a recipient. For example, page 170 is displayed when the recipient has received a valid unexpired file access code from the sender and used the file access code to access the file from the server.

Page 170 displays a confirmation message 172 that indicates to the sender that the file has been successfully shared with the intended recipient, who is also identified in the confirmation message. In some implementations, the identification of the intended recipient may include several attributes including, for example, as illustrated in FIG. 1F, a thumbnail image representing the recipient, a name of the recipient and a company affiliation for the recipient. In some other implementations, some suitable sub-combination of the identification attributes may be shown, or the intended recipient may not be identified.

In addition to the confirmation message, page 170 displays a button 174. The user may exit out of the software application, or at least out of the page 170, by selecting the button 174.

FIGS. 2A-2E illustrate examples of pages 210, 220, 230, 240 and 250 shown on a display of a client device for accessing from a server an electronic file that is shared with the user of the client device. The pages 210, 220, 230, 240 and 250 may be presented by the GUI of the software application that is executed on the client device of a user who is the recipient of a shared file. For example, the user may be the recipient of the electronic file that is shared by the sender of the client device displaying the pages 110, 120, 130, 150, 160 and 170. The software application that provides the pages 210, 220, 230, 240 and 250 may be similar to the software application that provides the pages 110, 120, 130, 150, 160 and 170. The software application may be configured to provide the pages 210, 220, 230, 240 and 250, or the pages 110, 120, 130, 150, 160 and 170 depending on whether the user is accessing a file as a recipient, or sharing a file as a sender, respectively.

The page 210 provides one or more buttons, such as 211, for different options for accessing the file that is shared with the recipient. When the button 211 is selected, page 210 is presented for entering a file access code, which includes instruction 213, a numeric keypad 214 and output cells 216 indicating the character input by the user.

In order to access the shared electronic file using a file access code, the recipient selects the button 211. Based on the recipient input, the software application running on the recipient client device provides the panel 212 on the page 210. The panel 212 facilitates the entry of the file access code that the recipient already may have received from the sender. The panel 212 includes instruction 213 that explains to the recipient what is to be done. The panel 212 provides an interactive input mechanism, such as the numeric keypad 214, for the recipient to enter the file access code. The characters are viewable on the output cells 216 as they are entered by the recipient, which may facilitate entering the characters correctly.

In the example shown in FIG. 2A, the file access code is a 4-digit numeric code. However, as described previously, in other implementations, the file access code may be an alphanumeric string or a phrase, and the length of the file access code also may be different from 4 digits or characters. In such implementations, the instruction 213 may be different, the keypad 214 may be an alphanumeric keypad and the number of output cells 216 may be different, corresponding to the different length of the file access code.

Returning to the example shown in FIG. 2A, when the recipient enters the file access code using the keypad 214, the application running on the recipient device sends the code to the server. In some implementations, along with the file access code, the application sends a credential associated with the recipient. The credential may be tied to a user account linked to the recipient that is stored at the server. The credential may be used to verify the identity of the recipient to the server, and/or prove to the server that the particular user is authorized to access the particular electronic file, in addition to checking the received file access code.

Upon receiving the request, the server verifies the identity of the recipient, and/or the authorization of the recipient to access the electronic file. In some implementations, if an expiry time is associated with the file access code, the server also may determine whether the file access code is still valid, that is, whether the validity period for the file access code has expired or not.

If the identity and/or the authorization are verified, and the validity period of the file access code has not expired, if such is implemented, the server looks up the electronic file corresponding to the received code. Based on identifying the electronic file that corresponds to the received code and if all checks are satisfied, the server transmits (or otherwise makes accessible) the electronic file to the application on the recipient's client device.

Upon receiving the document from the server, the recipient's client device may display the document. For example, FIG. 2B shows the GUI of the application running on the recipient's client device presenting the page 220 on the display of the client device, showing a representation of an electronic file 222 that is received from the server. The electronic file 222 may be the same as the electronic file 122 that is shared by the sender.

In some implementations, the representation of the electronic file 222 may include information, such as 223, about the sender of the electronic file. If the electronic file 222 is digitally signed, the representation also may include an indication 224 that the file has been digitally signed. For files that are not digitally signed, the indication 224 may be absent.

In some implementations, when the shared electronic file 222 is displayed on the recipient's client device, the application may provide the recipient an option to save the electronic file locally on the recipient's client device (and/or in storage associated with the server that is accessible to the recipient). This may be the case, for example, when the sender of the electronic file has set permissions for the file such that each recipient of the electronic file may save the file for later access. In such implementations, the application may provide the "Save" button 226 such that the recipient is able to save the electronic file 222. In addition, the "Discard" button 228 may be included to provide the recipient the option of discarding the locally cached copy of the electronic file 222.

In some implementations, if the recipient selects the button 226 to save the displayed electronic file 222, the GUI transitions from the page 220 to the page 230, as shown in FIG. 2C. The page 230 may be shown while a copy of the shared electronic file is being saved to storage (e.g., the hard drive or persistent flash memory included in the client device). The page 230 may present an animated icon 234 in the foreground, with the display of the electronic file 222 grayed out in the background 232. The animated icon 232 may indicate that the shared electronic file is in the process of the being saved to the local storage.

Once the electronic file is successfully saved, the GUI may transition to the page 240, which is shown in FIG. 2D. The page 240 is similar to the page 230, except that the animated icon is replaced by the icon 244, which is shown in the foreground with the display of the electronic file 222 grayed out in the background 242. The icon 244 provides an indication to the recipient that the shared electronic file has been successfully saved to the local storage coupled to the recipient's client device. In some implementations, the icon 244 may include a checkmark and text informing that the file has been saved, as shown in FIG. 2D.

In some implementations, if the recipient selects the button 228 on page 220 to discard the locally cached copy of the displayed electronic file 222, the GUI transitions from the page 220 to the page 250, as shown in FIG. 2E. The page 250 may present the panel 252 in the foreground, with the display of the electronic file 222 grayed out in the background 258. The panel 252 may "pop-up," or slide into view, in the foreground when the user selects button 228. The panel 252 includes a "Discard" button 254 and a "Cancel" button 256. The recipient may permanently discard the locally cached copy of the shared electronic file by selecting the button 254. On the other hand, if the recipient changes his or her mind and does not wish to discard the locally cached copy of the electronic file, the recipient may select the button 256 to cancel the discard transaction. In some implementations, when the recipient selects the button 256, the GUI transitions back to the page 220.

Figure 3:
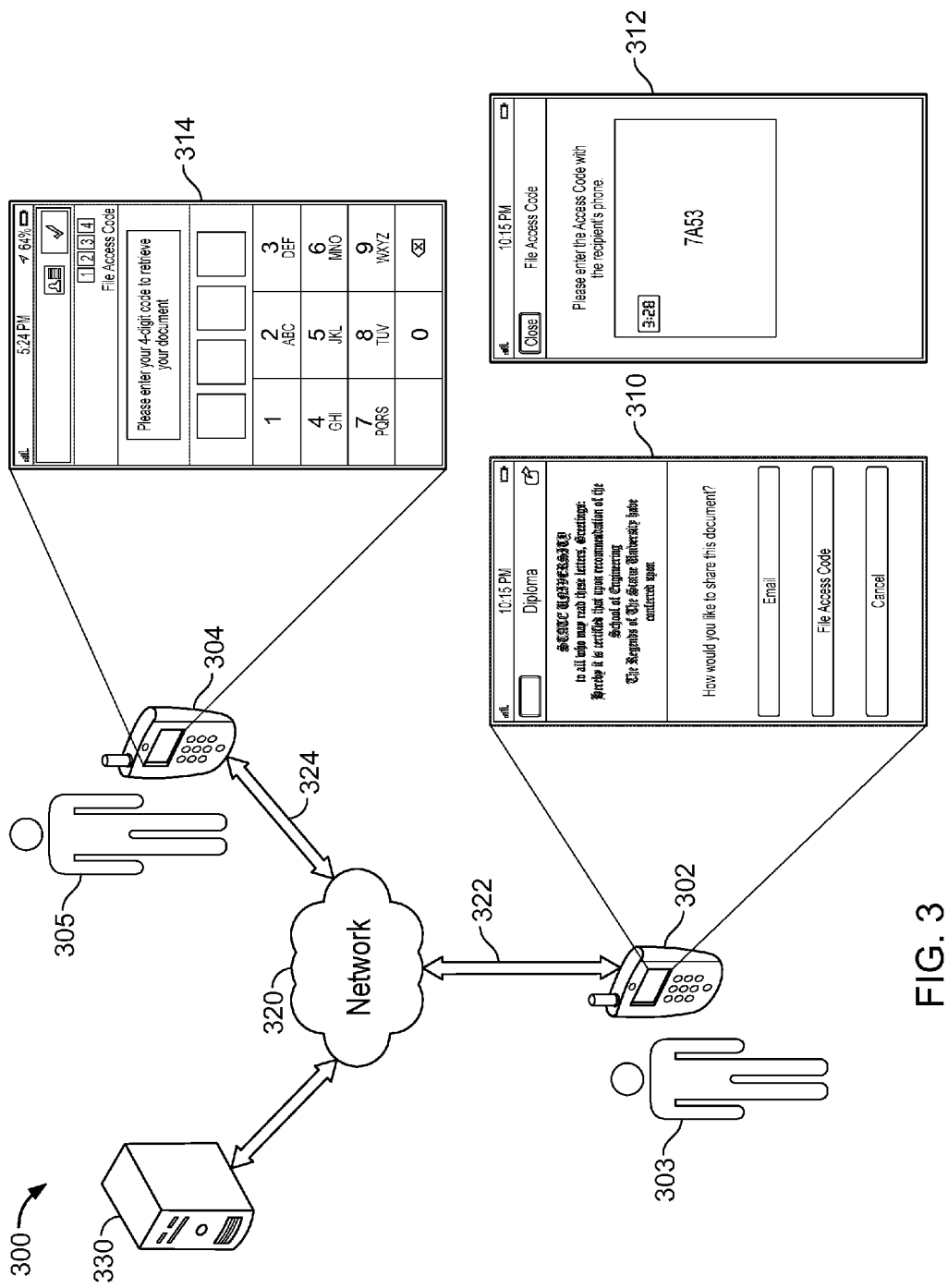
FIG. 3 illustrates an example of a system that facilitates the sharing of electronic files between client devices using file access codes generated by a server.

FIG. 3 illustrates an example of a system 300 that facilitates the sharing of electronic files between client devices using file access codes generated by a server. The system 300 may be used to implement the software application for file sharing that is described with reference to the pages 110, 120, 130, 150, 160 and 170 and 210, 220, 230, 240 and 250 illustrated in FIGS. 1A-1F and FIGS. 2A-2E, respectively.

The system 300 includes client devices 302 and 304 operated by users 303 and 305, respectively. Client devices 302 and 304 communicate with each other and with a server 330 using network connections 322 and 324, respectively, over a network 320. GUIs 310 and 312 are displayed on client device 302, while GUI 314 is displayed on client device 304.

Each client device 302 or 304 may be, for example, a mobile device such as a cellular phone, a smartphone, a tablet computer, a notebook or laptop computer, an e-book reader or a music player. Alternatively, each client device 302 or 304 may be a desktop computer or any other appropriate portable or stationary computing device. Each client device 302 or 304 may include one or more processors configured to execute instructions stored by a computer readable medium for performing various client operations, such as input/output, communication, data processing, software execution and the like. For example, client device 302 may execute the software application for sharing electronic files that displays the pages 110, 120, 130, 150, 160 and 170 on a display coupled to the client device; similarly, client device 304 may execute the software application for sharing electronic files that displays the pages 210, 220, 230, 240 and 250 on a display coupled to the client device. The displays coupled to the client devices 302 and 304 may be implemented as proximity-sensitive displays (for example, a touch screen) such that each user 303 and 305 may enter information by touching or hovering a control object (for example, a finger or stylus) over the respective display. The software application may be written in any suitable programming language, for example, C, Objective-C, C++, Java, Perl, HTML, etc.

The network 320 may include a circuit-switched data network, a packet-switched data network, or any other network able to carry data, for example, Internet Protocol (IP)-based or asynchronous transfer mode (ATM)-based networks, including wired or wireless networks. The network 320 may include the Internet, Wide Area Networks (WANs), Local Area Networks (LANs), analog or digital wired and wireless networks (for example, IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The network 320 may be configured to handle secure traffic such as secure hypertext transfer protocol traffic (HTTPS) or virtual private networks (VPN). In some implementations, the connections 322 and 324 may be secure connections, such as using VPN or HTTPS. However, in other implementations, the connections may be unsecured connections.

The communications from the client devices may be authenticated. For example, in cases where the client devices 302 and 304 are mobile devices and instances of a mobile application running on the devices are used to communicate with each other and with the server 330, the messages may be signed by the instances of the mobile application to indicate that the messages are generated by the mobile application. In addition, or as an alternative, the messages may be signed by hardware on the client devices 302 and 304, such as using the physical addresses of the respective network interfaces through which the communications are transferred. By signing the messages in such manner, the messages may be authenticated as coming from the client devices 302 or 304, and/or from the mobile application running on the client devices 302 or 304 respectively.

The server 330 may be a single server or it may represent a collection of servers, such as a server farm or another server arrangement. In either implementation, the server 330 includes one or more processors configured to execute instructions stored by a computer-readable medium for performing various server operations, such as executing database applications for managing user accounts and credentials associated with users of client devices, storing electronic files corresponding to the user accounts and running client-server applications for communicating with the software applications on the client devices 302 and 304 for generating file access codes for sharing electronic files between the devices.

In some implementations, the server 330 may function as a credential authority, or be coupled to a credential authority. In such implementations, the server 330 may be configured to validate representations of a credential presented by either user 303 or 305 on his/her respective client device 302 or 304 by comparing the user-presented representation with valid representations for the credential that is locally available to the server 330. The server 330 may validate the representations of a credential presented by either user 303 or 305 as a security mechanism to ensure that a user who wishes to share a file as a sender or a user who wishes to access a shared file is authorized to do so.

In this context, a credential may be taken to refer to an evidence of rights or entitlement to privileges that can be, for example, a token that may be used to prove identity to the server or to prove authorization to share or access a file, a badge to gain entrance to a location, an identifier for membership in a group (for example, a graduate of a school or a professional certification), a ticket for entry to an event, a redeemable voucher, a key that unlocks a lock (for example, for entry to a location), and so forth.

Credentials can be represented in various forms, some of which are described below. For example, credentials can be represented by parametrically-generated graphical representations, animated graphical representations, phrases, alphanumeric representations including binary, decimal, or hexadecimal numbers, and/or optical machine-readable representations such as bar codes and quick response (QR) codes. Combinations of one or more of these representations can also be used. In certain aspects, credentials also may be time-sensitive. For example, the credentials may be valid only for a predetermined time period such that they cannot be used for validation or any other suitable function either before or after the predetermined time period.

In operation, the server 330 manages and stores one or more credentials, associates user accounts and shared files with appropriate credentials, and provides representations of the credentials to users' client devices and/or processing systems (for example, operated by credential authorities) for validation. The server 330 can be any suitable computer or collection of computers executing software capable of managing, distributing, and validating representations of credentials for users and shared electronic files via the network 320 as described herein.

Credentials, user accounts and electronic files can be stored in a database (for example, MySQL, PostgreSQL, MS SQL Server, MongoDB), or other suitable data structure that can be accessed by the server 330. In some implementations, the server 130 may access the stored credentials and/or user accounts via web services such as representational state transfer (REST) style services.

In some implementations, the server 330 may present an interface so that users such as 303 and/or 305 can create user accounts. For example, the server 330 may present an interactive web interface via a web browser that is executed on computing devices associated with the users 303 and 305. The computing devices may be the client devices 302 and 304 or some other suitable machine used by users 303 and 305. Alternatively, applications on the server 330 may be directly accessible via a graphical user interface (GUI) provided by a dedicated software application running on the computing devices, or an application executed on a mobile device, such as the previously-described software application running on client devices 302 or 304.

The user accounts may be stored in a table or collection of tables in a database, or in any other suitable data structure(s) accessible by the server 330. The user accounts may include a variety of information, such as user name, user identifier (for example, a number or character string that uniquely identifies a user), and the address(es) of one or more client devices owned by or otherwise associated with the user.

In some implementations, the user accounts may be created by an entity that is different from the users linked to the user accounts. For example, a company, for example, Company A, may create user accounts for its employees and store the user accounts in the server 330 that is managed by Company A. The entity also may be the credential authority that generates and manages credentials for the user accounts. For example, Company A may generate and manage credentials for the user accounts of its employees; the employees may share electronic files using file access codes that are based on credentials generated by Company A, with the electronic files and linked credentials being managed by the server 330 that is operated by Company A and/or that provides a service to Company A.

In some implementations, the user accounts may include group accounts, which may be a collection of individual user accounts that may perform certain functions using a common credential. Certain individual users may be identified as belonging to a group by linking an entry for the corresponding user account to an entry for the group account, for example by use of a linking table. The group accounts may include a variety of information such as a group name, group identifier (for example, a number or character string that uniquely identifies a group), and a description of the group.

In addition, or as an alternative, to the creation of user accounts and group accounts by entities like a company or some other suitable institution, user accounts and group accounts may be created at the request of potential users through a web-based or other interface, or through any other suitable means such as sending email or SMS to the users. In some implementations, the potential users may be able to create user accounts by use of an application running on a client device, such as the software application running on client devices 302 and/or 304.

Once user accounts have been created, credentials may be generated by the server 330, or the credential authority that is linked to the server 330 (the server 330 and the associated credential authority are hereafter referred to interchangeably as the server 330), for associating with the user accounts, and for use to share electronic files by the users corresponding to the user accounts. For example, in a manner similar to that previously described, user 303, who wishes to share an electronic file with user 305, may use the software application running on the client device 302 and one or more credentials assigned to the user by the server 330 to request the server 330 to generate a file access code for sharing the desired electronic file. The users may interact with the server 330 through a web interface presented by the server 330 via web browsers running on the client devices, or through the software application providing dedicated GUIs, such as 310 and 312, on the client devices.

Based on the request from the user 303, the server 330 generates a file access code for the electronic file. In some implementations, the electronic file may already be present in the storage coupled to the server 330 and associated with the user account corresponding to user 330. In such cases, the server links the generated file access code to the stored electronic file and transmits the file access code to the client device 302 that is used by the user 303 to interact with the server 330.

In other implementations, the electronic file may not be present in the storage coupled to the server 330. In such cases, the user 303 may be prompted to upload the electronic file to the server, for example, through a GUI that is presented on the client device 302. While uploading the electronic file to the server, the user 303 may identify the user account by including, with the upload of the electronic file, one or more credentials that are associated with the corresponding user account.

Once the electronic file is uploaded to the server 330, the server stores the uploaded electronic file in the coupled storage and associates the electronic file with the user account corresponding to user 303 based on the credentials that are received along with the electronic file; then the server links the generated file access code to the stored electronic file and transmits the file access code to the client device 302.

The file access code may be presented to the user 303 using the GUI 312 on the client device 302. Subsequently, once the file access code is shared with the user 305, user 305 may attempt to access the shared electronic file by interacting with the server through the client device 304. For example, the user 305 interacts with the server 330 using the software application that is executed on the client device 304. The user 305 enters the file access code through the GUI 314 presented by the software application on the client device 304.

Once the client device transmits the file access code to the server 330, the server 330 checks whether the file access code is still valid (for example, in cases where the file access codes are time sensitive). If the file access code is determined to be valid, the server 330 locates the electronic file that is linked to the file access code (for example, by using internally-stored lookup tables that store the association between shared electronic files and corresponding file access codes). If the electronic file is successfully located, the server 330 transmits a copy of the electronic file to the client device 304 (or otherwise makes the electronic file accessible to the client device 304), which may then present the shared electronic file to the user 305 on the display of the client device 304.

In some implementations, the server 330 may not transmit the entire electronic file; instead, the server may send some information related to the electronic file, such as a portion of the electronic file, an identifier associated with the electronic file, or some other suitable information associated with the electronic file. This may be the case, for example, when there are restrictions placed on what may be shared. The restrictions may be placed by the user sharing the electronic file, or by the entity that creates and manages the user accounts. The restrictions may be based, for example, on a degree of security that is afforded to sensitive information that may be present in the electronic files.

In some implementations, once the file access code sent by the user 305 is successfully validated and a copy of the electronic file is sent to the client device 304, the copy of the electronic file may be locally stored on the client device 304 (or in storage at server 330 allocated to the user 305) such that the user 305 may view the copy of the electronic file at any time in the future. In other implementations, there may be restrictions placed on when the electronic file may be viewed. For example, the user 305 may be enabled to view the electronic file on the client device 304 within a short time window. In such implementations, information on the time window may be sent from the server 330 to the client device 304 along with the transmission of the shared electronic file. Once the viewable time window expires, the copy of the electronic file locally cached on the client device 304 may be destroyed by the software application based on instructions received from the server 330.

In some implementations, once the shared electronic file is received and stored on the client device 304, the user 305 may be enabled to share further the electronic file with other users. However, in other implementations, there may be restrictions placed on the shared electronic file (for example, by the sender 303) such that the user 305 may not be allowed to share the file with other users. Information on the restrictions may be sent from the server 330 to the client device 304 along with the transmission of the shared electronic file.

In some implementations, the sender of the electronic file, such as user 303, may share the electronic file with more than one recipient. The sender may use a common file access code to share the electronic file with multiple recipients. Alternatively, the sender may use different file access codes to share the electronic file with the multiple recipients. In some cases, each recipient may access the electronic file using a file access code that is shared exclusively with the recipient; while in other cases, each recipient may access the electronic file using a file access code that is shared with a subset of the recipients. The restrictions, some of which are indicated above, that are placed on accessing the electronic file may be different for different recipients, based on the file access code that is used by each recipient to access the file.

In some implementations, the file access code may be a one-time use access code. In such implementations, once the user 305 uses the file access code to retrieve the file from the server 330, the server may invalidate the file access code such that the access code cannot be used to retrieve the file any longer. Therefore, any additional request to retrieve the file based on the file access code will be refused by the server 330.

In some implementations, the sender of the electronic file, such as user 303, may be able to monitor which recipients have successfully accessed the shared electronic file. For example, when a recipient accesses the shared electronic file, the server 330 may send a confirmation to the software application running on the client device 302; the software application may present the confirmation to the user 303 on the display, such as using page 170. In situations where multiple recipients successfully access the electronic file, the page 170 may show information on the multiple recipients who have successfully accessed the electronic file.

The communications between the users 303 and 305 and the server 330 for the various operations outlined above, such as the creation of the user accounts, upload of electronic file and reception of the file access code by the user 303, sharing of the file access code from the user 303 to the user 305, transmission of the file access code and reception of the shared electronic file by the user 305, may take place over the network connections 322 and 324 that are established over the network 320 connecting the client devices 302, 304 and the server 330.

The system 300 may be used with any file management platform to enable sharing of electronic files using file access codes and other suitable codes. The file management platform may have application programming interfaces (APIs) that can be used by the system 300 to link the file management platform with the credential generation and file sharing functionality provided by the system 300.

Figure 4:
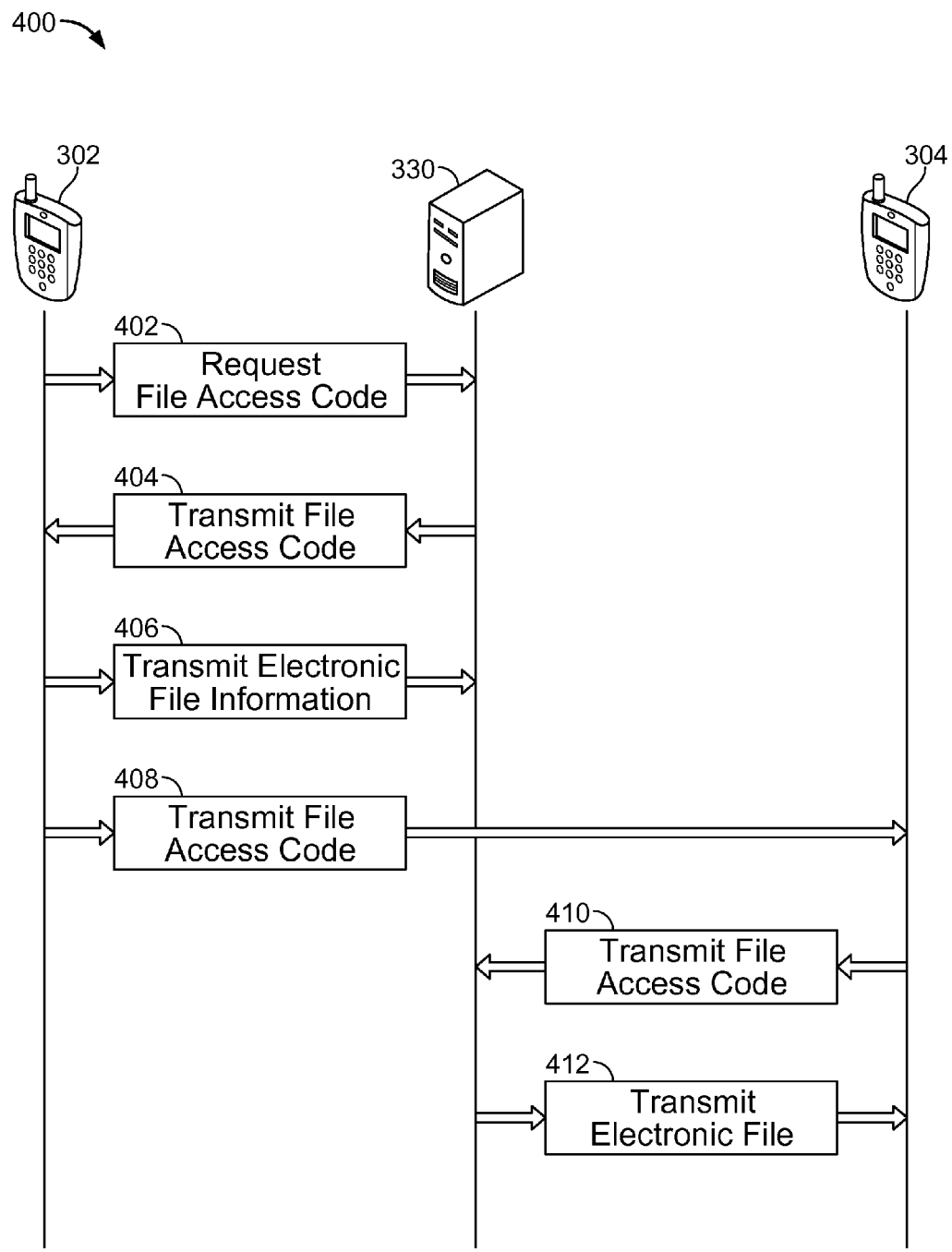
FIG. 4 shows a messaging diagram that illustrates an example of a flow of sample messages between client devices and a server for sharing an electronic file between the client devices using a file access code generated by the server.

FIG. 4 shows a messaging diagram 400 that illustrates an exemplary flow of sample messages between client devices and a server for sharing an electronic file between the client devices using a file access code generated by the server. For example, the client devices 302, 304 and the server 330 may exchange the sample messages shown in the diagram 400 to share an electronic file between the users 303 and 305 based on file access codes generated by the server 330. The following describes the exemplary flow of sample messages shown in the messaging diagram 400 as implemented by the system 300. However, the exemplary flow of sample messages shown in the messaging diagram 400 also may be implemented by other systems and system configurations.

The messages described below may be transmitted via any suitable protocol, for example hypertext transfer protocol (HTTP), secure HTTP (HTTPS), or SMS. Additionally, these example messages should not be considered limiting, as any suitable mechanism for performing the functions described could be used, and the messages could be sent or received in any suitable sequence.

In the message flow shown by the messaging diagram 400, initially, the client device 302 transmits a request message 402 for a file access code to the server 330. For example, the client device 302 may intend to share an electronic file with other users using the credential system managed by the server 330. Therefore, the client device sends a request for a file access code that can be used to share the electronic file.

In response to the request message 402, the server 330 transmits a response message 404 to the client device 302 that includes a file access code. In some implementations, however, the server 330 may push the message 404 to the client device 302 without first receiving a request message 402.

Next, the client device 302 transmits to the server 330 a message 406 that includes information corresponding to the electronic file to the shared. For example, in cases where the electronic file is not already present at the server, the client device 302 may upload the electronic file from local storage to the server 330. In other implementations where the electronic file is already present at the server 330, the message 406 may include an identifier for the electronic file such that the server is able to locate the correct file in its local storage.

In some implementations, the client device 302 may send the message 406 to the server 330 before receiving the message 404. This may be the case, for example, when the server 330 identifies the electronic file to be shared before sending the file access code to the client device. In some implementations, the message 406 may be merged with the message 402 such that the client device 302 sends information on the electronic file along with the request for the file access code in a single message.

In some implementations, when the client device 302 uploads the electronic file to the server 330, the client device 302 digitally signs the electronic file using a private key of the user 303 of the client device 302. In such cases, if the recipient client device 304 has the sender client device 302's public key, the client device 304 can verify that the electronic file has not been changed since the client device 302 uploaded the electronic file to the server 330.

Once the file access code is received from the server 330, the client device 302 may share the electronic file with other users. In order to share the electronic file with the client device 304, the client device 302 sends a message 408 to the client device 304 that includes the file access code. The message 408 may be sent using the same software application that is used by the client device 302 to communicate with the server 330, or the message 408 may be sent using another transmission mechanism, such as SMS, email, ultrasonic transmission, BLUETOOTH™, or some other suitable communication. Alternatively, user 303 may speak the file access code to user 305, for example, in person, over the phone, or using some other suitable audio messaging service.

Upon receiving the message 408, the client device 304 retrieves the file access code from the message 408. Then, in order to access the electronic file that the client device 302 is sharing, the client device 304 sends to the server 330 a message 410 that includes the file access code.

Upon receiving the message 410, the server 330 identifies the electronic file that is linked with the file access code based on the file access code included in the message 410. In some implementations, the server checks whether the file access code is valid, for example, whether the time period for which the file access code may be used has expired.

If the server is able to identify successfully the electronic file that is linked with the file access code included in the message 410, the server transmits the electronic file to the client device 304 in a message 412. Upon receiving the message 412 from the server, the client device 304 may access the electronic file. In this manner, the electronic file may be shared successfully by the client device 302 with the client device 304.

Exemplary Process

Figure 5:
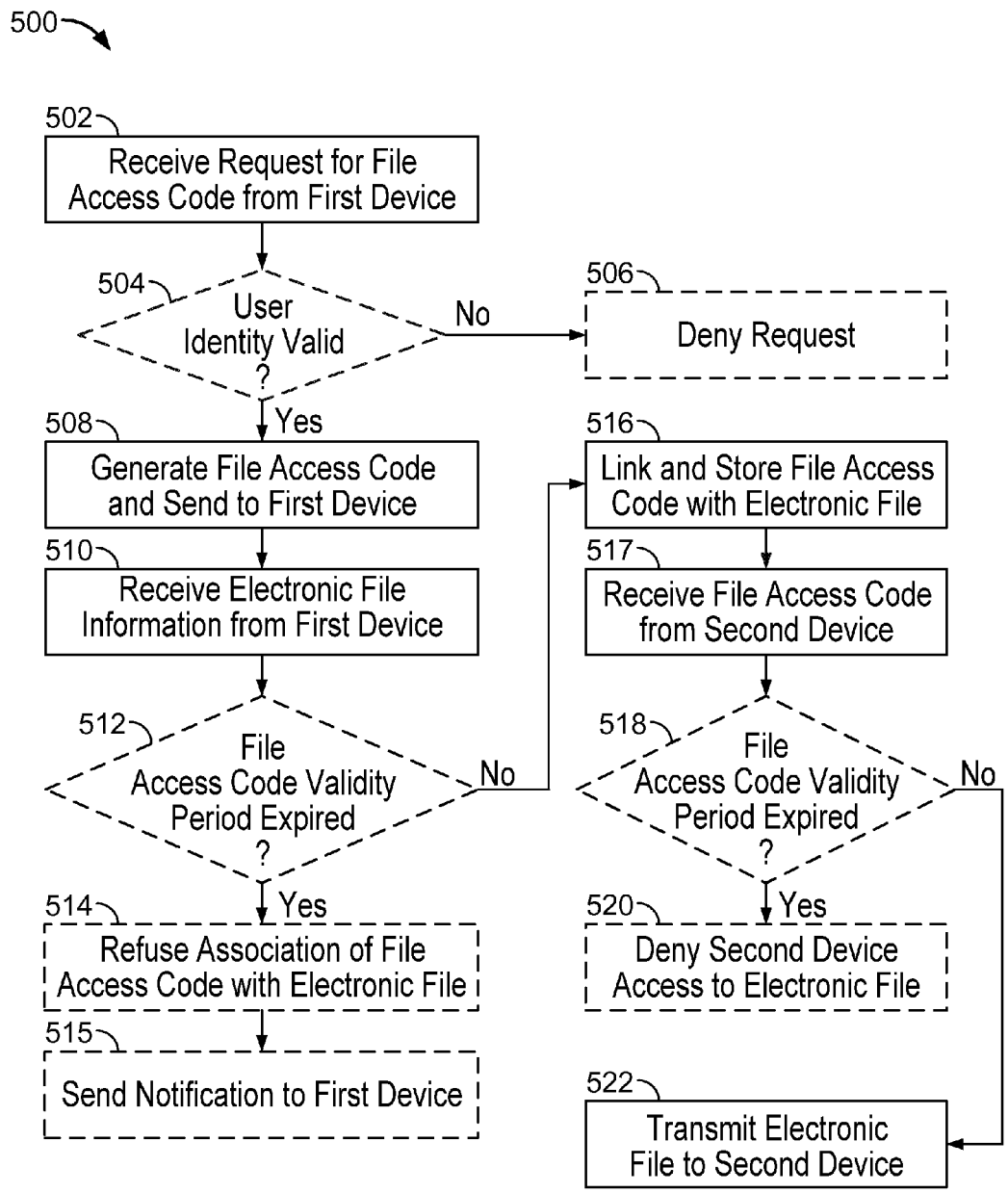
FIG. 5 illustrates an example of a process that may be used to share an electronic file between client devices using a file access code generated by a server.

FIG. 5 illustrates an exemplary process 500 that may be used to share an electronic file between client devices using a file access code generated by a server. For example, the process 500 may be used by the client devices 302 and 304 to share an electronic file between the users 303 and 305 based on file access codes generated by the server 330. Accordingly, the following describes the process 500 as implemented by the system 300. However, the process 500 also may be implemented by other systems and system configurations.

The server receives a request for a file access code from a first client device (502). For example, the server 330 may receive from the client device 302 the message 402, requesting that a file access code be generated and sent to the client device 302 for sharing an electronic file.

In some implementations, the server determines whether the user identity is valid (504). For example, the request from the client device 302 may include (or otherwise identify) one or more credentials that were previously generated for the user 303. The credentials may be used to prove to the server that the request is generated by the user 303 using the client device 302. In addition, the credentials may be used to prove to the server that the client device 302 is authorized to share electronic files.

If the server determines that the user identity is not valid, the server denies the request (506). The check for the validity of the user identity may be optional and may not be implemented in all scenarios. The optional nature is indicated by the dotted lines around (504) and (506).

If the server determines that the user identity is valid, or, in implementations where the check for user identity is not performed, upon receiving the request for the file access code, the server generates a file access code and sends it to the first device (508). For example, the server 330 generates a file access code and sends it to the client device 302.

Subsequently, the server receives the electronic file information from the first device (510). For example, the server 330 receives the electronic file that is uploaded by the client device 302 using the software application running on the client device. This may be the case in situations where the electronic file is not already stored in local storage coupled to the server. In implementations where the server 330 already stores the electronic file that the client device 302 intends to share, the information that is received from the client device 302 may be an identifier for the electronic file. Consequently, the server may identify and locate the stored electronic file using the identifier.

Once the electronic file is received from the client device, or identified in local storage based on the information received, the server stores the electronic file and associates the electronic file with the file access code. In some implementations, the server also may store, along with the electronic file and the file access code, information indicative of one or more credentials of the sender who is sharing the electronic file.

In some implementations, the information received from the first device in (510) may include the file access code that was generated by the server for enabling sharing of the electronic file. Upon receiving the file access code, the server checks whether the file access code validity time period has expired (512). This may be the case, for example, when the file access code is time-sensitive and is associated with a time period during which it is valid, that is, may be used.

If the server determines that the file access code validity time period has expired, the server refuses association of the file access code with the electronic file (514). For example, after receiving the file access code from the server, the client device may have delayed in sending information corresponding to the electronic file to the server, such that the validity time period for the file access code has expired. In such an event, the server refuses to link the expired file access code with the electronic file.

In some implementations, the server may send a notification to the first device (515). For example, the server 330 may notify the client device 302 that uploaded information corresponding to the electronic file. The notification may be an error notification and may indicate that the file access code was not successfully linked to the electronic file. In addition, the notification may ask the user of the client device to generate a new file access code. The notification may be presented to the user on the display of the client device using the page 160.

The check for the validity time period of the file access code may be optional and may not be implemented in all scenarios. For example, this may not be used in implementations where the file access codes are not time-sensitive. The optional nature is indicated by the dotted lines around (512), (514) and (515).

If the server determines that the validity time period of the file access code has not expired, or, in implementations where the check for validity time period of the file access code is not performed, upon receiving the information on the electronic file, the server links and stores the file access code with the electronic file (516). For example, the server 330 links the file access code with the electronic file that is being shared and stores both the link and the electronic file in local storage coupled to the server 330.

Subsequently, the server receives the file access code from the second device (517). For example, the user 303 may send the file access code to the user 305, who sends the file access code to the server 330 using his/her client device 304.

Upon receiving the file access code from the second device, the server checks whether the file access code validity time period has expired (518). This may be the case, for example, when the file access code is time-sensitive and is associated with a time period during which it may be used.

If the server determines that the file access code validity time period has expired, the server denies the second device access to the electronic file (520). For example, by the time the client device 304 sends the file access code to the server 330, the validity time period for the file access code may have expired. In such an event, the server refuses to allow the client device 304 to access the electronic file. The server may send a notification to the client device 304 informing the user 305 that the file access code has expired and therefore the user 305 may not access the shared electronic file. In some implementations, the server also may send a notification to the client device 302 of the sender, indicating that the file access code that was linked to the shared electronic file has expired. In addition, the notification may ask the user 303 of the client device 302 to generate a new file access code. The notification may be presented to the user 303 on the display of the client device 302 using the page 160.

The check for the validity time period of the file access code upon receiving the code from the second device may be optional and may not be implemented in all scenarios. For example, this may not be used in implementations where the file access codes are not time-sensitive. The optional nature is indicated by the dotted lines around (518) and (520).

If the server determines that the validity time period of the file access code has not expired, or, in implementations where the check for the validity time period of the file access code is not performed, upon receiving the file access code from the second device, the server transmits the electronic file to the second device (522). For example, the server 330 may identify the shared electronic file based on the file access code that is received from the client device 304. Upon identifying the electronic file, the server 330 locates the electronic file in local storage, retrieves the file, and transmits the electronic file to the client device 304.

In this manner, the electronic file may be successfully shared between the multiple client devices using the file access code generated and managed by the server. In some implementations, upon sending the electronic file to the second device, the server also may send a notification to the first device informing the sender that the file was successfully shared with the recipient. The notification may be presented on the display of the first device using the page 170.

In some implementations, when the server receives the file access code from the second device, the server identifies both the electronic file and one or more credentials of the sender. The server then uses the identified credential(s) to query the sender to confirm that the recipient who is attempting to access the electronic file is authorized to do so. Responsive to receiving confirmation from the sender, the server transmits the electronic file to the intended recipient. The recipient may be identified based on having logged-into the software application running on the recipient's client device.

In some implementations, the sender may have associated a list of one or more "trusted" users with the credential(s) that are used to upload the electronic file to the server. If the recipient of the file access code who is trying to access the electronic file is one of the "trusted" users specified by the sender, the process of requiring the sender's approval to send the electronic file to the intended recipient may be bypassed. Alternatively, the "whitelist" of trusted users may be used as a first layer of security such that only users who are listed on the "whitelist" of trusted users may be able to retrieve the electronic file in the first place. In such implementations, if a user attempts to retrieve the electronic file, but is not listed in the "whitelist," the user may be denied outright. However, after a user has been identified as being listed on the "whitelist," the server may still query the sender for confirmation before releasing the electronic file to the user.

In some implementations, the sender may have associated a list of one or more "untrusted" users with the credential used to upload the electronic file. If the user who is trying to access the electronic file is one of the "untrusted" users specified by the sender, the user may be denied outright.

In some other implementations, the server may not request authorization from the sender to share the electronic file with the user who provides the file access code. However, in such implementations, the ability of the recipient to use the file access code to retrieve the shared electronic file may limited to the period of time during which the file access code is valid.

In some implementations, the server may provide multiple different types of credentials (for example, for multiple different organizations), and, in order for the intended recipient to access the electronic file, the intended recipient may need to have a credential of the same type (for example, a credential issued by the same organization as the credential that the electronic file sender used to transfer the electronic file). For example, the electronic file sender may use a Company A employee badge to upload the electronic file to the server, and the server may store an indication that the electronic file was uploaded using a Company A employee badge. Then, when a recipient attempts to access the electronic file using a file access code, the recipient may be allowed to access the electronic file provided the recipient sends the file access code using a Company A employee badge or the server otherwise is able to confirm that the recipient has a Company A employee badge. This may be the case even if the file access code sent by the recipient is a valid file access code.

In some implementations, the electronic file sender may indicate to the server identities of intended recipient(s) who are authorized to access the electronic file. For example, if the credential that the electronic file sender uses to transfer the electronic file is a Company A employee badge, the electronic file sender may have the option of selecting intended recipients for the electronic file from among any other Company A employee badge holders. The server then may store an indication of the selected intended recipient(s) and only transfer the electronic file to a user who is the intended recipient and who presents the valid file access code.

A wide variety of applications is possible based on the subject matter described above. For example, file access code may be used to provide an added layer of security in sharing electronic files, in addition to the intended recipient having to authenticate him/herself using credentials. The sharing of electronic files may be limited to within certain groups of users, such as employees of a company. The sender may share an electronic file simultaneously with multiple recipients in an efficient manner, and receive confirmation indicating which recipients have successfully received the shared electronic file. The sender may limit the sharing of electronic files to predetermined time periods, such that the recipients may not be able to access sensitive information at other times. The recipients may be allowed to view a copy of the shared file on their client devices, for example, using the GUI provided by the software application connected to the server, but not allowed to store a copy locally, thereby preventing sensitive information from being disseminated without having any control over the process.

The features described can be implemented in digital electronic circuitry, in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at a server and from a first client device, a request for a file access code that is associated with a first electronic file, the request including a user identifier associated with a first user of the first client device and a credential identifier, wherein the file access code is shared by the first client device with other client devices to enable the other client devices to access the first electronic file using the file access code;
responsive to receiving the request:
determining, by the server and based on the credential identifier, that the user identifier is associated with a user account at the server,
generating, by the server, the file access code, including associating a validity time period with the file access code,
associating, by the server, the file access code with the user account, and
transmitting, from the server, a response to the first client device including the file access code;
receiving, at the server and from the first client device, information associating the first electronic file with the file access code for sharing the first electronic file;
responsive to receiving the information corresponding to the first electronic file:
determining, by the server, whether the validity time period for the file access code has elapsed,
based on determining that the validity time period has not elapsed, generating, by the server, an association between the first electronic file and the file access code,
based on the generated association between the first electronic file and the file access code, causing the first electronic file to be uploaded from the first client device to the server, and
authenticating the first electronic file using a digital signature associated with the user identifier;
receiving, at the server and from a second client device, a request to access the first electronic file, the request including the file access code that is sent to the second client device by the first client device; and
responsive to receiving the request to access the first electronic file including the file access code from the second client device:
determining, by the server, whether the validity time period for the file access code has elapsed,
based on determining that the validity time period has not elapsed, communicating, by the server, with a client device associated with the first user to verify whether the second client device is authorized to access the first electronic file; and
upon verifying that the second client device is authorized to access the first electronic file and based on determining that the association between the first electronic file and file access code is valid, identifying, by the server, the first electronic file, and enabling the second client device to access the information corresponding to the first electronic file.

2. The method of claim 1, wherein generating the file access code includes generating one of an alphanumeric string, a phrase or a hexadecimal code.

3. The method of claim 1, wherein the first electronic file is one of a textual document, a graphical document, an audio file, a video file or a multimedia file.

4. The method of claim 1, wherein receiving an identifier of the first electronic file comprises:
receiving, at the server and from the first client device, the identifier of the first electronic file; and
storing, by the server, the first electronic file, including the association with the file access code.

5. The method of claim 4, wherein storing, by the server, the first electronic file comprises:
storing, by the server, the first electronic file in association with the user account.

6. The method of claim 4, wherein storing, by the server, the first electronic file comprises storing, by the server, the first electronic file prior to generating the file access code.

7. The method of claim 4, wherein storing, by the server, the first electronic file comprises storing, by the server, the first electronic file in an encrypted form.

8. The method of claim 1, wherein receiving the file access code from the second client device comprises:
receiving, at the server and from the second client device, the file access code and a second user identifier associated with the second client device.

9. The method of claim 8, wherein communicating, by the server, with the client device associated with the first user to verify whether the second client device is authorized to access the first electronic file comprises:
based on determining that the validity time period has not elapsed, transmitting, by the server, a query to the client device associated with the first user for confirmation that a second user associated with the second user identifier is authorized to access the first electronic file;
receiving, by the server and from the client device associated with the first user, a response to the query;
determining, by the server and based on the response to the query, whether the second user is authorized to access the first electronic file; and
based on determining that the second user is authorized to access the first electronic file, enabling, by the server, the second user to access the information corresponding to the first electronic file.

10. The method of claim 8, further comprising:
based on determining that the validity time period has not elapsed, checking, by the server, whether the second user identifier is included in a whitelist of user identities; and
based on determining that the second user identifier is included in the whitelist of user identities, transmitting, by the server, the first electronic file to the second client device.

11. The method of claim 10, wherein the whitelist of user identities includes a group of user identities that are indicated as authorized to access the first electronic file by the first user, and wherein the method comprises:
receiving the whitelist of user identities at the server from the first client device.

12. The method of claim 1, wherein receiving the file access code from the second client device comprises:
receiving, at the server, the file access code from an application running on the second client device, and
wherein the server is configured to determine whether the file access code is authenticated by the application running on the second client device prior to transmitting the first electronic file to the second client device.

13. The method of claim 12, wherein transmitting the first electronic file to the second client device comprises:
transmitting, by the server, the first electronic file to the application running on the second client device, and
wherein the application is configured for displaying the first electronic file on the second client device using a user interface associated with the application.

14. The method of claim 13, further comprising:
preventing, by the application, the second client device from locally storing a copy of the first electronic file.

15. The method of claim 1, wherein enabling the second client device to access the information corresponding to the first electronic file comprises:
transmitting, by the server and to the second client device, an identifier associated with the first electronic file.

16. The method of claim 1, wherein enabling the second client device to access the information corresponding to the first electronic file comprises:
transmitting, by the server and to the second client device, a copy of the first electronic file.

17. The method of claim 1, further comprising:
receiving, at the server and from a third client device, the file access code;
responsive to receiving the file access code from the third client device, determining, by the server, whether the validity time period for the file access code has elapsed; and
based on determining that the validity time period has elapsed, transmitting, by the server, a message to the third client device, the message indicating a refusal to send the first electronic file to the third client device.

18. The method of claim 1, further comprising:
responsive to receiving the information corresponding to the first electronic file:
computing an amount of validity time still remaining for the file access code; and
transmitting information encoding the amount of validity time still remaining to the first client device.

19. The method of claim 18, further comprising:
causing the amount of validity time still remaining to be displayed on the first client device.

20. A system comprising:
a processor; and
instructions embedded in a non-transitory machine-readable medium for execution by the processor and, when executed, configured to cause the processor to perform operations comprising:
receiving, at a server and from a first client device, a request for a file access code that is associated with a first electronic file, the request including a user identifier associated with a first user of the first client device and a credential identifier, wherein the file access code is shared by the first client device with other client devices to enable the other client devices to access the first electronic file using the file access code;
responsive to receiving the request:
determining, by the server and based on the credential identifier, that the user identifier is associated with a user account at the server,
generating, by the server, the file access code, including associating a validity time period with the file access code,
associating, by the server, the file access code with the user account, and
transmitting, from the server, a response to the first client device including the file access code;
receiving, at the server and from the first client device, information for associating the first electronic file with the file access code for sharing the first electronic file;
responsive to receiving the information corresponding to the first electronic file:
determining, by the server, whether the validity time period for the file access code has elapsed,
based on determining that the validity time period has not elapsed, generating, by the server, an association between the first electronic file and the file access code,
based on the generated association between the first electronic file and the file access code, causing the first electronic file to be uploaded from the first client device to the server, and
authenticating the first electronic file using a digital signature associated with the user identifier;
receiving, at the server and from a second client device, a request to access the first electronic file, the request including the file access code that is sent to the second client device by the first client device; and
responsive to receiving the request to access the first electronic file including the file access code from the second client device:
determining, by the server, whether the validity time period for the file access code has elapsed,
based on determining that the validity time period has not elapsed, communicating, by the server, with a client device associated with the first user to verify whether the second client device is authorized to access the first electronic file; and
upon verifying that the second client device is authorized to access the first electronic file and based on determining that the association between the first electronic file and file access code is valid, identifying, by the server, the first electronic file, and enabling the second client device to access the information corresponding to the first electronic file.

21. A method comprising:
receiving, at a server and from a first client device, a request for a file access code that is associated with a first electronic file, the request including a user identifier associated with a first user of the first client device and a credential identifier, wherein the file access code is shared by the first client device with other client devices to enable the other client devices to access the first electronic file using the file access code;
responsive to receiving the request:
determining, by the server and based on the credential identifier, that the user identifier is associated with a user account at the server,
generating, by the server, the file access code, including associating a validity time period with the file access code,
associating, by the server, the file access code with the user account, and
transmitting, from the server, a response to the first client device including the file access code;
receiving, at the server and from the first client device, information associating the first electronic file with the file access code for sharing the first electronic file;
responsive to receiving the information corresponding to the first electronic file:

determining, by the server, whether the validity time period for the file access code has elapsed, based on determining that the validity time period has not elapsed, generating, by the server, an association between the first electronic file and the file access code, and based on the generated association between the first electronic file and the file access code, causing the first electronic file to be uploaded from the first client device to the server;

receiving, at the server and from a second client device, a request to access the first electronic file, the request including a second user identifier associated with the second client device and the file access code that is sent to the second client device by the first client device; and responsive to receiving the request to access the first electronic file including the second user identifier and the file access code from the second client device:

determining, by the server, whether the validity time period for the file access code has elapsed, based on determining that the validity time period has not elapsed, communicating, by the server, with a client device associated with the first user to query whether a second user corresponding to the second user identifier associated with the second client device is authorized to access the first electronic file;

receiving, by the server and from the client device associated with the first user, a response to the query;

verifying, by the server and based on the response to the query, whether the second user is authorized to access the first electronic file; and upon verifying that the second user corresponding to the second user identifier associated with the second client device is authorized to access the first electronic file and based on determining that the association between the first electronic file and file access code is valid, identifying, by the server, the first electronic file, and enabling the second user corresponding to the second user identifier associated with the second client device to access the information corresponding to the first electronic file.

* * * * *